(12) United States Patent
Williams et al.

(10) Patent No.: US 10,101,031 B2
(45) Date of Patent: Oct. 16, 2018

(54) SWIRLER MOUNT INTERFACE FOR GAS TURBINE ENGINE COMBUSTOR

(71) Applicant: United Technologies Corporation, Hartford, CT (US)

(72) Inventors: Alexander W. Williams, Windsor Locks, CT (US); Seth A. Max, Manchester, CT (US); Christopher B. Lyons, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 291 days.

(21) Appl. No.: 14/911,205

(22) PCT Filed: Jun. 30, 2014

(86) PCT No.: PCT/US2014/044904
§ 371 (c)(1),
(2) Date: Feb. 9, 2016

(87) PCT Pub. No.: WO2015/030928
PCT Pub. Date: Mar. 5, 2015

(65) Prior Publication Data
US 2016/0201915 A1    Jul. 14, 2016

Related U.S. Application Data

(60) Provisional application No. 61/872,329, filed on Aug. 30, 2013.

(51) Int. Cl.
| F23R 3/60 | (2006.01) |
| F23R 3/12 | (2006.01) |
| F23R 3/14 | (2006.01) |
| F23R 3/28 | (2006.01) |

(52) U.S. Cl.
CPC ............... *F23R 3/12* (2013.01); *F23R 3/14* (2013.01); *F23R 3/286* (2013.01); *F23R 3/60* (2013.01); *F23R 2900/00017* (2013.01); *Y02T 50/675* (2013.01)

(58) Field of Classification Search
CPC .... F23R 3/12; F23R 3/14; F23R 3/286; F23R 3/60; F23R 2900/00017
See application file for complete search history.

(56) References Cited

U.S. PATENT DOCUMENTS

| 4,999,996 A | 3/1991 | Duchene et al. |
| 5,675,971 A | 10/1997 | Angel et al. |
| 6,253,538 B1 | 7/2001 | Sampath et al. |
| 6,324,828 B1 | 12/2001 | Willis et al. |
| 6,415,610 B1 | 7/2002 | Parker |

(Continued)

FOREIGN PATENT DOCUMENTS

EP    1507118 A2 *   2/2005   ............... F23R 3/10

OTHER PUBLICATIONS

EP search report for EP14839726.8 dated Aug. 23, 2016.

*Primary Examiner* — Steven Sutherland
(74) *Attorney, Agent, or Firm* — O'Shea Getz P.C.

(57) ABSTRACT

A swirler for a combustor of a gas turbine engine includes a swirler outer body with a male snap component and/or female snap component of a snap-fit interface defined around a swirler central longitudinal axis. A bulkhead assembly for a combustor of a gas turbine engine includes a swirler mounted to a bulkhead support shell through a snap-fit interface.

12 Claims, 4 Drawing Sheets

(56) References Cited

U.S. PATENT DOCUMENTS

| | | |
|---|---|---|
| 7,134,286 B2 | 11/2006 | Markarian et al. |
| 7,140,189 B2 | 11/2006 | Markarian et al. |
| 7,185,497 B2 | 3/2007 | Dudebout et al. |
| 7,269,958 B2 | 9/2007 | Stastny et al. |
| 7,308,794 B2 | 12/2007 | Morenko et al. |
| 7,559,202 B2 | 7/2009 | Prociw et al. |
| 7,624,576 B2 | 12/2009 | Alkabie et al. |
| 7,658,339 B2 | 2/2010 | Prociw et al. |
| 7,716,931 B2 | 5/2010 | Mancini et al. |
| 7,721,436 B2 | 5/2010 | Prociw et al. |
| 7,950,233 B2 | 5/2011 | Alkabie et al. |
| 8,146,365 B2 | 4/2012 | Shum et al. |
| 8,171,736 B2 | 5/2012 | Hawie et al. |
| 2003/0061815 A1* | 4/2003 | Young ..................... B23P 6/00 60/748 |
| 2004/0083735 A1 | 5/2004 | Borns et al. |
| 2006/0020725 A1 | 1/2006 | Dropps et al. |
| 2009/0205339 A1* | 8/2009 | Huang ..................... F23R 3/14 60/737 |
| 2010/0107653 A1 | 5/2010 | Paskevich et al. |
| 2010/0242484 A1 | 9/2010 | Suleiman et al. |
| 2011/0005231 A1 | 1/2011 | Low |
| 2012/0198653 A1 | 8/2012 | Tanner et al. |
| 2012/0240595 A1 | 9/2012 | Gerendas |
| 2012/0272660 A1 | 11/2012 | Garrett |
| 2013/0004906 A1 | 1/2013 | Brown et al. |
| 2016/0169521 A1 | 6/2016 | Drake et al. |

\* cited by examiner

SWIRLER MOUNT INTERFACE FOR GAS TURBINE ENGINE COMBUSTOR

CROSS-REFERENCE TO RELATED APPLICATION

This application claims priority to PCT Patent Application No. PCT/US2014/044904 filed Jun. 30, 2014, which claims priority to U.S. Patent Appln. Ser. No. 61/872,329 filed Aug. 30, 2013, which are hereby incorporated herein by reference in their entireties.

STATEMENT REGARDING FEDERALLY SPONSORED RESEARCH OR DEVELOPMENT

This disclosure was made with Government support under FA8650-09-D-2923 awarded by the United States Air Force. The Government may have certain rights in this disclosure.

BACKGROUND

The present disclosure relates to a gas turbine engine and, more particularly, to a combustor section therefor.

Gas turbine engines, such as those that power modern commercial and military aircraft, include a compressor section to pressurize airflow, a combustor section to burn a hydrocarbon fuel in the presence of the pressurized airflow, and a turbine section to extract energy from the resultant combustion gases.

The combustor section generally includes radially spaced inner and outer liners that define an annular combustion chamber therebetween. A plurality of circumferentially distributed fuel nozzles project into a forward section of the combustion chamber through a respective fuel nozzle swirler to supply the fuel to be mixed with the pressurized air. Each fuel nozzle swirler is typically brazed directly to the forward section bulkhead shell. Although effective and light weight, the brazed assembly requires replacement of entire bulkhead sections to repair each fuel nozzle swirler. Alternatively, the fuel nozzle swirler may be mounted to the forward section bulkhead shell with various mechanical fasteners. Although effective, each of the fasteners requires safety wires, which results in a relatively complicated and heavy arrangement which may also block cooling holes through the bulkhead shell. Blockage of cooling holes may further complicate these thermally challenged areas.

SUMMARY

A swirler for a combustor of a gas turbine engine is provided according to one disclosed non-limiting embodiment of the present disclosure. This swirler includes a swirler outer body with a male snap component and/or female snap component of a snap-fit interface.

In a further embodiment of the present disclosure, the male snap component or the female snap component may be directed outward with respect to a swirler central longitudinal axis.

In a further embodiment of any of the foregoing embodiments of the present disclosure, the swirler outer body may define the male snap component.

In a further embodiment of any of the foregoing embodiments of the present disclosure, the male snap component may extend from a frustro-conical surface.

A forward assembly for a combustor of a gas turbine engine is provided according to another disclosed non-limiting embodiment of the present disclosure. This forward assembly includes a swirler mounted to a bulkhead support shell through a snap-fit interface.

In a further embodiment of any of the foregoing embodiments of the present disclosure, the swirler may include a male snap component.

In a further embodiment of any of the foregoing embodiments of the present disclosure, the bulkhead support shell may include a female snap component around a swirler central longitudinal axis.

In a further embodiment of any of the foregoing embodiments of the present disclosure, the male snap component may extend radially outward with respect to a swirler central longitudinal axis.

In a further embodiment of any of the foregoing embodiments of the present disclosure, a cowl may be mounted to the bulkhead support shell.

In a further embodiment of any of the foregoing embodiments of the present disclosure, the cowl may include a circumferentially distributed hood port to extend into contact with the swirler to apply an axial load to the swirler.

In a further embodiment of any of the foregoing embodiments of the present disclosure, the snap-fit interface may be located along a swirler outer body.

In a further embodiment of any of the foregoing embodiments of the present disclosure, a swirler inner body may be mounted within the swirler outer body along a swirler central longitudinal axis.

In a further embodiment of any of the foregoing embodiments of the present disclosure, a guide housing may be mounted to the swirler inner body.

In a further embodiment of any of the foregoing embodiments of the present disclosure, a capture plate may be mounted to the guide housing to retain a nozzle guide such that the nozzle guide is movable with respect to the guide housing.

In a further embodiment of any of the foregoing embodiments of the present disclosure, the cowl may include a circumferentially distributed hood port to extend into contact with the swirler to apply an axial load to the swirler, where the snap-fit interface is located along a frustro-conical surface of the swirler.

In a further embodiment of any of the foregoing embodiments of the present disclosure, the frustro-conical surface of the swirler may be defined along a swirler outer body.

In a further embodiment of any of the foregoing embodiments of the present disclosure, a guide housing may be mounted to a swirler inner body mounted at least partially within the swirler outer body. A capture plate may be mounted to the guide housing to retain a nozzle guide such that the nozzle guide is movable with respect to the guide housing.

A method of assembling a swirler into a bulkhead support shell of a gas turbine engine is provided according to another disclosed non-limiting embodiment of the present disclosure. This method includes snap fitting the swirler into the bulkhead support shell along a swirler axis.

In a further embodiment of any of the foregoing embodiments of the present disclosure, the method may include anti-rotating the swirler within the bulkhead support shell.

In a further embodiment of any of the foregoing embodiments of the present disclosure, the method may include at least partially axially retaining the swirler within the bulkhead support shell with a cowl mounted to the bulkhead support shell.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
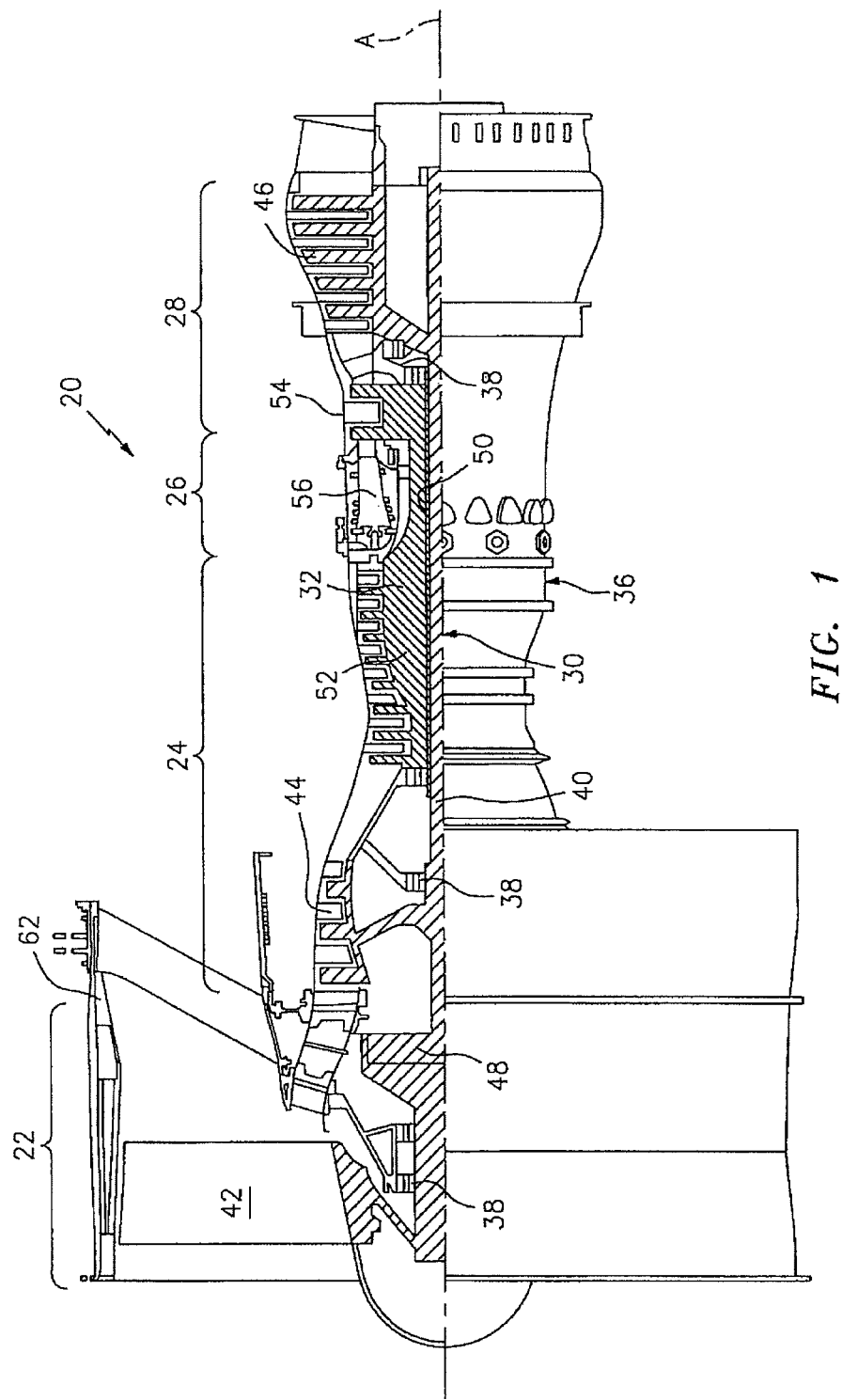
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might also include an augmentor section (not shown) among other systems or features. Referring again to FIG. 1, the fan section 22 drives air along a bypass flowpath and into a core flow path to the compressor section 24, the compressor section 24 compresses and communicates the core airflow into the combustor section 26 for expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between a low pressure compressor (LPC) and a high pressure compressor (HPC) and an intermediate pressure turbine (IPT) between a high pressure turbine (HPT) and a low pressure turbine (LPT).

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 may drive the fan 42 directly, or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and a high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes. The shafts 40, 50 are supported at a plurality of points by the bearing structures 38 within the static structure 36.

Core airflow is compressed by the LPC 44 then the HPC 52, mixed with fuel and burned in the combustor 56, then expanded in the HPT 54 and LPT 46. The LPT 46 and the HPT 54 rotationally drive the respective low spool 30 and high spool 32 in response to the expansion.

Figure 2:
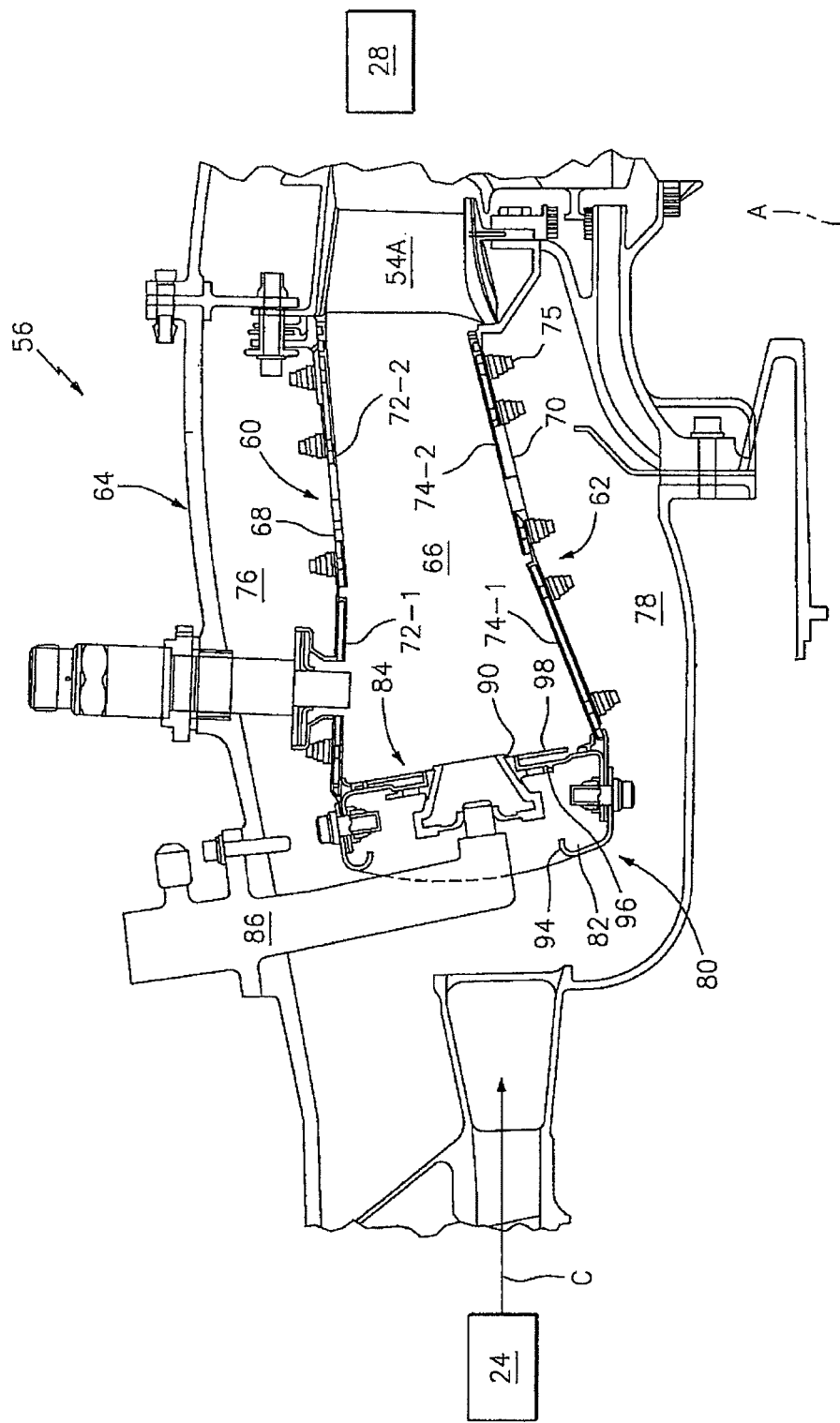
FIG. 2 is a partial sectional view of an exemplary annular combustor that may be used with the gas turbine engine shown in FIG. 1.

With reference to FIG. 2, the combustor 56 generally includes a combustor outer wall 60 and a combustor inner wall 62. The outer wall 60 and the inner wall 62 are spaced inward from a diffuser case 64 such that a generally annular chamber 66 is defined therebetween. The outer wall 60 and the diffuser case 64 define an annular outer plenum 76 and the inner wall 62 and the diffuser case 64 define an annular inner plenum 78.

Each wall 60, 62 generally includes a respective support shell 68, 70 that supports one or more respective liners 72, 74. Each of the liners 72, 74 may be generally rectilinear and manufactured of, for example, a nickel based super alloy or ceramic material. It should be appreciated that although a particular combustor is illustrated, other combustor types with various combustor liner arrangements will also benefit herefrom. It should be further appreciated that various cooling flows including, but not be limited to, impingement and effusion cooling may also be provided within the walls 60, 62.

The combustor 56 further includes a forward assembly 80 immediately downstream of the compressor section 24 to receive compressed airflow therefrom. The forward assembly 80 generally includes a cowl 82 and a bulkhead subassembly 84 that support a multiple of fuel nozzles 86 (one shown) and a multiple of swirlers 90 (one shown). The bulkhead subassembly 84 includes a bulkhead support shell 96 secured to the walls 60, 62, and a multiple of circumferentially distributed bulkhead liners 98 secured to the bulkhead support shell 96. Each swirler 90 is mounted within an opening through the bulkhead subassembly 84.

The cowl 82 extends radially between, and is secured to, the forwardmost ends of the walls 60, 62 axially forward of the bulkhead subassembly 84. The cowl 82 includes a multiple of circumferentially distributed hood ports 94 (one shown) that accommodate the respective fuel nozzle 86 and introduce air into each the multiple of swirlers 90. Each fuel nozzle 86 may be secured to the outer case 64 to project through one of the hood ports 94 and into the respective swirler 90 such that the centerline of the fuel nozzle 86 is generally concurrent with the centerline F of the respective swirler 90 (see FIG. 4). Each swirler 90 is circumferentially aligned with one of the hood ports 94 to project through the bulkhead subassembly 84.

The forward assembly 80 directs a portion of the core airflow into the combustion chamber 66 while the remainder of the core air enters the annular outer plenum 76 and the annular inner plenum 78. The multiple of fuel nozzles 86, the swirlers 90 and the surrounding structure generate an intimately blended fuel-air mixture that supports combustion in the chamber 66.

Figure 3:
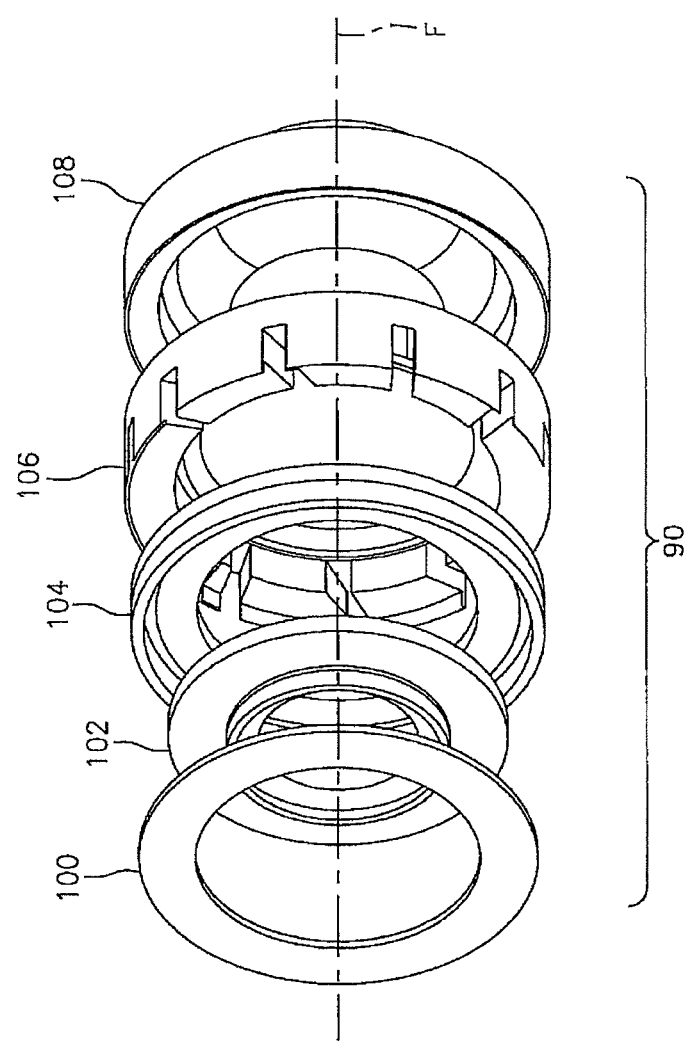
FIG. 3 is an exploded view of a swirler.

With reference to FIG. 3, each swirler 90 generally includes a capture plate 100, a nozzle guide 102, a guide housing 104, a swirler inner body 106 and a swirler outer body 108 along its swirler central longitudinal axis F. The capture plate 100 is mounted to the guide housing 104 to retain the nozzle guide 102 such that the nozzle guide 102 is movable with respect to the guide housing 104. It should be appreciated that the swirler body components may be welded, brazed, fastened together via hardware or otherwise attached together. It should be further appreciated that any number of swirler body components as well as alternative or additional components may be utilized herewith and that the two part inner and outer swirler body shown is merely but one example assembly.

Figure 4:
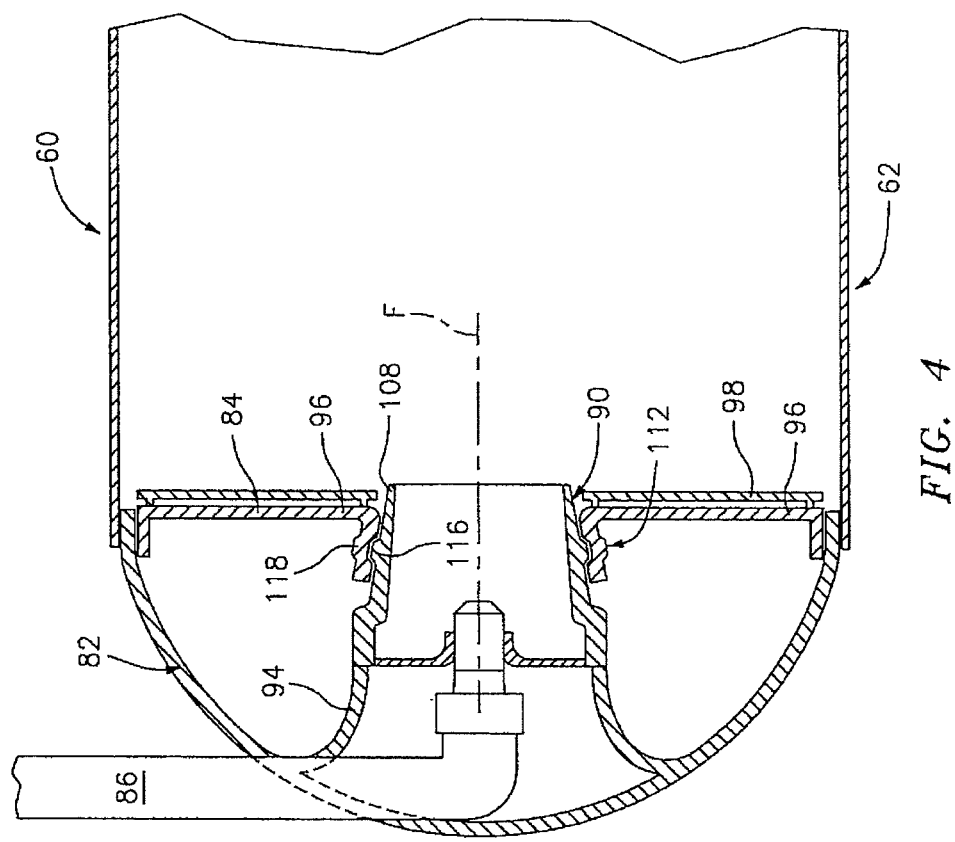
FIG. 4 is an exploded sectional view of a snap-fit interface for mounting the swirler to a combustor forward assembly.

With reference to FIG. 4, each swirler 90 is attached to a respective bulkhead support shell 96 of the bulkhead subassembly 84 at a snap-fit interface 112. The snap-fit interface 112 is defined around the swirler central longitudinal axis F to facilitate removal, repair or replacement of each individual swirler 90. The snap-fit interface 112 in one disclosed non-limiting embodiment generally includes a male snap component 116 on a frustro-conical surface of the swirler outer body 108 and a female snap component 118 on the bulkhead support shell 96 around the respective swirler central longitudinal axis F. It should be appreciated that the interface may alternatively be reversed.

The swirler 90 may be constrained and at least partially axially held within the bulkhead support shell 96 through the applied force from the cowl 82. The circumferentially distributed hood ports 94 may additionally extend into contact with the swirler 90 to further apply an axial load to the swirler 90 and maintain the axial position thereof. That is, the hood port 94 also prevents rotation and movement of the snap-fit interface 112 in the aft direction while the entire assembly is limited by the frustro-conical shape of the swirler 90 from movement in the forward direction to provide a captive assembly with multiple redundancies.

The snap-fit interface 112 provides a robust maintenance interface with minimal components that facilitates ready replacement of the swirler 90. The snap-fit interface 112 utilizes both the bulkhead subassembly and the cowl 82 to fully constrain the swirler 90 such that no additional mechanical fasteners or braze are required. This simplifies the assembly process by part count reduction over mechanical fastener attachments and assembly time required for wire-locking mechanical fasteners and reduces cost and maintainability over a braze attachment. With respect to combustor development and testing, the snap-fit interface 112 increases the flexibility of the test article by decoupling the bulkhead subassembly 84 and swirlers 90, which permits individual replacement. With respect to maintenance, the snap-fit interface 112 facilitates increased reparability through individual replacement.

It should be appreciated that various coatings may be applied to the snap-fit interface 112 to minimize the possibility of seizure. Moreover, the extended hood port 94 provides a secure fail-safe redundant retention for the snap-fit interface 112.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A forward assembly for a combustor of a gas turbine engine, the forward assembly comprising:
   a bulkhead support shell;
   a swirler mounted to said bulkhead support shell through a snap-fit interface; and
   a cowl mounted to said bulkhead support shell,
   wherein said cowl includes a circumferentially distributed hood port to extend into contact with said swirler to apply an axial load to said swirler, and said snap-fit interface is located along a frustro-conical surface of said swirler.

2. The forward assembly as recited in claim 1, wherein said swirler includes a male snap component.

3. The forward assembly as recited in claim 2, wherein said bulkhead support shell includes a female snap component around a swirler central longitudinal axis.

4. The forward assembly as recited in claim 3, wherein said male snap component extends radially outward with respect to the swirler central longitudinal axis.

5. The forward assembly as recited in claim 1, wherein said snap-fit interface is located along a swirler outer body.

6. The forward assembly as recited in claim 5, further comprising a swirler inner body mounted within said swirler outer body along a swirler central longitudinal axis.

7. The forward assembly as recited in claim 6, further comprising a guide housing mounted to said swirler inner body.

8. The forward assembly as recited in claim 7, further comprising a capture plate mounted to said guide housing to retain a nozzle guide such that said nozzle guide is movable with respect to said guide housing.

9. The forward assembly as recited in claim 1, wherein said frustro-conical surface of said swirler is defined along a swirler outer body.

10. The forward assembly as recited in claim 9, further comprising a guide housing mounted to a swirler inner body mounted at least partially within said swirler outer body, and a capture plate mounted to said guide housing to retain a nozzle guide such that said nozzle guide is movable with respect to said guide housing.

11. A method of assembling a swirler into a bulkhead support shell of a gas turbine engine, the method comprising:
   snap fitting at a snap-fit interface the swirler into the bulkhead support shell along a swirler axis; and mounting a cowl to said bulkhead support shell,
wherein said cowl includes a circumferentially distributed hood port that extends into contact with the swirler to apply an axial load to the swirler, and the snap-fit interface is located along a frustro-conical surface of the swirler.

12. A forward assembly for a combustor of a gas turbine engine, the forward assembly comprising:
a bulkhead support shell;
a swirler mounted to said bulkhead support shell through a snap-fit interface located along a frustro-conical surface of said swirler.

* * * * *